(12) United States Patent
Apostolo et al.

(10) Patent No.: US 7,645,845 B2
(45) Date of Patent: Jan. 12, 2010

(54) POLYMERIZATION PROCESS

(75) Inventors: Marco Apostolo, Bellinzago (IT); Valeri Kapeliouchko, Alessandria (IT); Alessandro Galia, Palermo (IT); Onofrio Scialdone, Palermo (IT); Giuseppe Filardo, Palermo (IT)

(73) Assignee: Solvay Solexis S.p.A., Milan (IT)

( * ) Notice: Subject to any disclaimer, the term of this patent is extended or adjusted under 35 U.S.C. 154(b) by 15 days.

(21) Appl. No.: 11/476,560

(22) Filed: Jun. 29, 2006

(65) Prior Publication Data
US 2007/0015888 A1    Jan. 18, 2007

(30) Foreign Application Priority Data
Jul. 7, 2005    (EP) .................................. 05106219

(51) Int. Cl.
*C08F 12/20* (2006.01)
(52) U.S. Cl. ........................ 526/193; 526/242; 526/247; 526/249; 526/250; 524/115; 524/127; 524/142
(58) Field of Classification Search ................ 526/209, 526/242, 247; 428/14; 524/544
See application file for complete search history.

(56) References Cited

U.S. PATENT DOCUMENTS

| | | | |
|---|---|---|---|
| 4,864,006 A * | 9/1989 | Giannetti et al. ............ | 526/209 |
| 5,312,882 A | 5/1994 | DeSimone et al. | |
| 5,382,623 A | 1/1995 | DeSimone et al. | |
| 5,672,667 A | 9/1997 | DeSimone et al. | |
| 6,107,393 A * | 8/2000 | Abusleme et al. ............ | 524/545 |
| 6,531,227 B1 * | 3/2003 | van den Reek et al. ..... | 428/411.1 |
| 6,593,439 B1 * | 7/2003 | Christian et al. ............ | 526/246 |
| 6,730,762 B2 * | 5/2004 | Lousenberg et al. ........ | 526/250 |
| 2001/0037007 A1 | 11/2001 | Lousenerg et al. | |
| 2002/0077435 A1 * | 6/2002 | DeSimone et al. .......... | 526/255 |
| 2003/0213548 A1 * | 11/2003 | Lehrter et al. ............... | 156/220 |
| 2004/0007154 A1 * | 1/2004 | Irvin et al. ............... | 106/31.13 |
| 2004/0097384 A1 * | 5/2004 | Calcut et al. ................. | 508/582 |
| 2004/0110028 A1 * | 6/2004 | Irvin et al. ................... | 428/690 |

FOREIGN PATENT DOCUMENTS

| | | |
|---|---|---|
| EP | 0 816 397 | 1/1998 |
| WO | WO 2006/068818 | 6/2006 |
| WO | WO 2007/011468 | 1/2007 |

OTHER PUBLICATIONS

Gebel et al., J. Phys. Chem. 1993, 97, 8664-8668.*
Holmes et al., J. Phys. Chem. B 1999, 103, 5703-5711.*

(Continued)

*Primary Examiner*—Marc S Zimmer
*Assistant Examiner*—Nicole M Buie
(74) *Attorney, Agent, or Firm*—Oblon, Spivak, McClelland, Maier & Neustadt, L.L.P.

(57) ABSTRACT

A process for producing a polymer by polymerizing at least one fluorinated monomer in the presence of a radical initiator and a surfactant in a polymerization medium containing essentially only carbon dioxide. The surfactant is a functional (per)fluoropolyether having recurring units (R1) and at least one functional group containing a heteroatom other than fluorine, the recurring units containing at least one ether linkage in the main chain and at least one fluorine atom. Molded article containing the polymer obtained from the process.

13 Claims, 2 Drawing Sheets

OTHER PUBLICATIONS

Solvay Solexis, "Fluorolink Surface Treatment Agents: Product Data Sheet", retrieved from internet Feb. 23, 2005, 4 pages.*

Horst Fr. Schroder, et al., Stability of Fluorinated Surfactants in Advanced Oxidation Processes—a Follow up of degradation products using flow injection-mass spectromerty, liquid chromatography—mass spectrometry and liquid chromatography—multiple stage mass spectometry, Journal of Chromatography A, 1082 (2005) 110-119.

* cited by examiner

5(a)

5(b)

POLYMERIZATION PROCESS

This application is based on, and embodiments priority to, European Patent Application No. 05106219.8 filed Jul. 7, 2005, incorporated herein by reference in its entirety.

This invention pertains to an improved polymerization process for manufacturing fluoropolymers in carbon dioxide, to the polymer products made therefrom and to the article thereof.

The synthesis of polymers in supercritical carbon dioxide has been the object of significant research efforts since the publication of the milestone article of DeSimone from University of North Caroline describing homogeneous free radical polymerization of fluoroacyl monomers [J. M. DeSimone et al. *Science*, 1992, 257, 945].

The potential advantages related to the utilization of such reaction medium can be briefly summarized as follow:
- an easier separation of the solvent from the polymer;
- a faster kinetics of diffusion controlled polymerization steps;
- a better control of the product quality as this compressible solvent can be considered inert to chain transfer reactions.

At the current status of the art, the class of macromolecular materials whose synthesis can enjoy significant product, process and safety advantages from the utilization of dense $CO_2$ based reaction media is constituted by fluorinated polymers.

Traditional routes for the synthesis of fluoropolymers generally comprise the heterogeneous polymerization (emulsion or suspension) utilizing an aqueous or organic continuous phase. Recently however, environmental concerns have arisen with respect to the potential effects of the polymerization waste solutions typically discharged at the conclusion of traditional polymerization processes. In particular, the difficulty of removing residual organic monomers, surfactants and other materials from polymerization media discharge has prompted the industry to investigate more environmentally compatible alternatives. For example, U.S. Pat. Nos. 5,312,882 and 5,382,623 to DeSimone et al., propose methods for preparing water-insoluble polymers by carrying out heterogeneous polymerization reactions in a continuous phase comprising carbon dioxide.

It is known that heterogeneous polymerizations conducted in any polymerization medium are improved by the addition of surfactants which stabilize the monomer and/or growing polymer particles in the polymerization medium to deter particle coagulation in the heterogeneous system. U.S. Pat. Nos. 5,312,882 and 5,382,623 to DeSimone et al. disclose a series of surfactants which are useful for stabilizing heterogeneous polymerizations in carbon dioxide. These surfactants are amphiphilic, having one segment which is soluble in the carbon dioxide continuous phase and one segment which is insoluble in the carbon dioxide continuous phase. For each monomer to be polymerized in the heterogeneous polymerization system, a new surfactant has been designed for the purpose of optimizing the efficiency of the surfactant in the polymerization system.

The role of the surfactant should be to prevent the coalescence of polymer particles after their precipitation leading to the formation of an high interfacial area polymer latex.

Nevertheless, up to now, surfactants which have been proposed for the polymerization of fluorinated monomers failed to succeed in preventing such coalescence.

Thus, there remains a need in the art of environmentally compatible polymerization systems for compounds which are capable of stabilizing such polymerization systems.

Aforementioned improvement should lead to a better control of the morphology of the polymer, decreased fouling of the reactor and higher productivity, thanks to the better dispersion of free radicals inside the polymer particles.

Thus, as a first aspect, the present invention provides a polymerization process, said process comprising polymerizing at least one fluorinated monomer in the presence of a radical initiator and a surfactant in a polymerization medium comprising carbon dioxide to provide a polymer product, characterized in that the surfactant is a functional (per)fluoropolyether.

It has been surprisingly observed that the polymerization advantageously occurs without fouling or deposit formation on the reactor walls and the product is obtained as dry powder having improved morphology (percentage of organized structures, i.e. of particles of regular shape).

Advantageously, polymerizing said fluorinated monomer in the polymerization medium provides a heterogeneous reaction mixture comprising the polymer product in the polymerization medium.

As used herein, the term "polymer" encompasses oligomers and polymers, having molecular weight from $10^2$ to $10^8$; also the term encompasses homopolymers and copolymers, depending upon the number of monomers which are employed.

The term "heterogeneous reaction mixture" as used herein, refers to a reaction mixture having at least two phases. One phase is termed the "continuous phase", which comprises a fluid, and the other is termed the "dispersed phase", comprising the polymer product.

The term "heterogeneous reaction mixture" is intended to encompass the product of both dispersion polymerizations, in which the polymerization starts out homogeneous, and emulsion polymerizations, in which the polymerization starts out heterogeneous and the polymerization initiator is preferentially solubilized in the continuous phase. As used herein, a compound is "preferentially solubilized" in one phase over another when it is more soluble in that phase.

The polymerization medium of the present invention is typically initially homogeneous, i.e. it is a medium wherein the fluorinated monomer(s), the initiator and the functional (per)fluoropolyether are solubilized, and generally becomes heterogeneous as the polymerization proceeds and the polymer is formed. The newly produced polymer advantageously forms the dispersed phase of the reaction. The polymer is notably stabilized in the dispersed phase by the presence of the functional (per)fluoropolyether which reduces the surface tension between the phases.

The present invention is thus preferably carried out by dispersion polymerization. A dispersion polymerizaton starts as a one phase, homogeneous system where both the monomer and the initiator are soluble in the polymerization medium but the resulting polymer is not. Dispersion polymerizations are generally described in Barrett, K. E. J. Dispersion Polymerization in Organic Media; Wiley: London, 1975; and Napper, D. H. Polymer Stabilization of Colloidal Dispersions; Academic Press: London, 1983.

As a result, the polymerization process of the invention is preferably initiated homogeneously and the resulting polymer phase preferably separates into primary particles. These primary particles advantageously become stabilized by functional (per)fluoropolyether present in the system that advantageously prevent particle flocculation and aggregation. Polymer colloids produced by dispersion polymerizations are usually stabilized by a "steric" mechanism as compared with an electrostatic mechanism that is common to collodial stabilization in aqueous environments. Steric stabilization of a collodial dispersion is usually imparted by the surfactant(s) that become absorbed onto the surface of the dispersed phase.

In the process of the invention, the functional (per)fluoropolyether used as surfactant advantageously acts as amphiphilic molecule containing an anchoring segment, which attaches to the particle either by physical or chemical adsorption, and stabilizing moieties that are soluble in the continuous phase.

The term "fluorinated monomer" as used within the context of the present invention is understood to denote an ethylenically unsaturated monomer comprising at least one fluorine atom.

The fluorinated monomer can further comprise one or more other halogen atoms (Cl, Br, I). Should the fluorinated monomer be free of hydrogen atom, it is designated as per (halo)fluoromonomer. Should the fluorinated monomer comprise at least one hydrogen atom, it is designated as hydrogen-containing fluorinated monomer.

Suitable fluorinated monomers are notably chosen among:

$C_2$-$C_8$ perfluoroolefins, such as tetrafluoroethylene (TFE) and hexafluoropropene (HFP);

$C_2$-$C_8$ hydrogenated fluoroolefins, such as vinyl fluoride, vinylidene fluoride, 1,2-difluoroethylene and trifluoroethylene;

$C_2$-$C_8$ perhalofluoromonomers, such as chlorotrifluoroethylene;

perfluoroalkylethylenes complying with formula $CH_2=CH-R_{f0}$, in which $R_{f0}$ is a $C_1$-$C_6$ perfluoroalkyl;

chloro- and/or bromo- and/or iodo-$C_2$-$C_6$ fluoroolefins, like chlorotrifluoroethylene;

(per)fluoroalkylvinylethers complying with formula $CF_2=CFOR_{f1}$ in which $R_{f1}$ is a $C_1$-$C_6$ fluoro- or perfluoroalkyl, e.g. $CF_3$, $C_2F_5$, $C_3F_7$;

$CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;

(per)fluoroalkylvinylethers complying with formula $CF_2=CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like $-C_2F_5-O-CF_3$;

functional (per)fluoro-oxyalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;

fluorodioxoles, especially perfluorodioxoles;

and mixtures thereof.

Preferred fluorinated monomers are those chosen from the group consisting of tetrafluoroethylene (TFE), vinylidene fluoride (VDF), chlorotrifluoroethylene (CTFE) and mixtures thereof.

The fluorinated monomers can be used in the process of the invention in combination with one or more comonomer(s) able to copolymerize with the fluorinated monomer.

The comonomer can be either hydrogenated (i.e. free of fluorine atom) or fluorinated (i.e. containing at least one fluorine atom).

Non limitative examples of suitable hydrogenated comonomers are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

Suitable fluorinated comonomers are notably chosen among the fluorinated monomer, as above described.

In addition, comonomer that provide cross-linking and branching, such as divinyl benzene, di- and triacrylates, and acrylic acid, can also be included.

The fluorinated monomer is typically present in the amount of from 1 to 70 percent by weight based upon the entire weight of the polymerization medium.

The process of the invention is particularly suitable for manufacturing the following polymers:

TFE homopolymer and its copolymers;

melt-processable fluoropolymers comprising recurring units derived from TFE and at least one other comonomer chosen among PFA (perfluoropropylvinylether), PMVE (perfluoromethylvinylether), HFP and ethylene;

VDF homopolymer and its copolymers;

CTFE homopolymer and its copolymers;

fluoroelastomers based on VDF/HFP, VDF/TFE/HFP, VDF/TFE/PMVE, VDF/TFE/HFP/PMVE, TFE/PMVE;

amorphous perfluorinated copolymers comprising cyclic perfluorinated units, such as, for instance, those described in US 2002/0177667;

functionalized fluoropolymers comprising recurring units derived from fluorinated monomeric units comprising a sulphonyl group $-SO_2F$, such as, for instance, those described in U.S. Pat. Nos. 6,576,100 and 6,025,092.

Within the context of the present invention, the term functional (per)fluoropolyether is intended to denote a polymer comprising recurring units (R1) and at least one functional group comprising a heteroatom other than fluorine, said recurring units comprising at least one ether linkage in the main chain and at least one fluorine atom (fluoropolyoxyalkene chain).

The weight average molecular weight of the functional (per)fluoropolyether is generally of at least 400, preferably of at least 600.

The weight average molecular weight of the functional (per)fluoropolyether is generally of at most 100 000, preferably of at most 20 000.

The weight average molecular weight is measured according to standard GPC techniques.

Good results have been obtained with functional (per)fluoropolyether having an average molecular weight comprised between 400 and 100 000.

Excellent results have been obtained with functional (per)fluoropolyether having an average molecular weight comprised between 500 and 2500.

As used herein, the term "functional group" has its general meaning as intended in organic chemistry and it encompasses atoms or combination of atoms bonded to the carbon skeleton of the fluoropolyoxyalkene chain, which confers to the (per)fluoropolyether specific reactivity and chemical properties.

Preferably the recurring units R1 of the functional (per)fluoropolyether are selected from the group consisting of:

(I) $-CFX-O-$, wherein X is $-F$ or $-CF_3$; and (II) $-CF_2-CFX-O-$, wherein X is $-F$ or $-CF_3$; and (III) $-CF_2-CF_2-CF_2-O-$; and (IV) $-CF_2-CF_2-CF_2-CF_2-O-$; and (V) $-(CF_2)_j-CFZ-O-$ wherein j is an integer from 0 to 3 and Z is a fluoropolyoxyalkene chain comprising from 1 to 20 recurring units chosen among the classes (I) to (IV) here above;

and mixtures thereof.

Should the functional (per)fluoropolyether comprise recurring units R1 of different types, advantageously said recurring units are randomly distributed along the fluoropolyoxyalkene chain.

Preferably the functional (per)fluoropolyether is a compound complying with formula (I) here below:

$$T_1\text{-}(CFX)_p\text{—}O\text{—}R_f\text{—}(CFX)_{p'}\text{-}T_2 \quad (I)$$

wherein:
each of X is independently F or $CF_3$;
p and p', equal or different each other, are integers from 0 to 3;
$R_f$ is a fluoropolyoxyalkene chain comprising repeating units R°, said repeating units being chosen among the group consisting of:
(i) —CFXO—, wherein X is F or $CF_3$,
(ii) —$CF_2$CFXO—, wherein X is F or $CF_3$,
(iii) —$CF_2CF_2CF_2O$—,
(iv) —$CF_2CF_2CF_2CF_2O$—,
(v) —$(CF_2)_j$—CFZ-O— wherein j is an integer from 0 to 3 and Z is a group of general formula —$OR_f'T_3$, wherein $R_f'$ is a fluoropolyoxyalkene chain comprising a number of repeating units from 0 to 10, said recurring units being chosen among the followings: —CFXO—, —$CF_2$CFXO—, —$CF_2CF_2CF_2O$—, —$CF_2CF_2CF_2CF_2O$—, with each of each of X being independently F or $CF_3$; and $T_3$ is a $C_1$-$C_3$ perfluoroalkyl group, and mixtures thereof;
at least one of $T_1$ and $T_2$, which are the same or different each other, is a functional group comprising a heteroatom chosen among O, S, N, P and mixtures thereof; the remaining $T_1$ or $T_2$, if any, being chosen among H, halogen atoms, $C_1$-$C_{30}$ end-group.

Suitable examples of $T_1$ and $T_2$ groups comprising at least one heteroatom chosen among O, S, N, P heteroatoms are those complying with formula (II)

$$\text{-}A_q\text{-}E \quad (II)$$

wherein:
A denotes a $C_1$-$C_{20}$ linking group; q is 0 or 1; E denotes an ionizable group comprising at least one heteroatom chosen among O, S, N, P and mixtures thereof.

The bivalent $C_1$-$C_{20}$ linking group A is preferably selected from the following classes:
1) linear substituted or unsubstituted $C_1$-$C_{20}$ alkylenic chain, optionally containing heteroatoms in the alkylenic chain; preferably linear aliphatic group of formula —$(CH_2)_m$—, with m integer between 1 and 20;
2) (alkylene)cycloaliphatic $C_1$-$C_{20}$ groups or (alkylen)aromatic $C_1$-$C_{20}$ groups, optionally containing heteroatoms in the alkylenic chain or in the ring;
3) linear or branched polyalkylenoxy chains, comprising in particular repeating units selected from: —$CH_2CH_2O$—, —$CH_2CH(CH_3)O$—, —$(CH_2)_3O$—, —$(CH_2)_4O$—;
4) the carbonyl group —C(O)—; and mixtures thereof.

Non limitative examples of ionizable groups E are notably —$OPO(OH)_2$, —$NR''_4X''$, with X'' being an hydroxyl or halogen atom and each of the R'' group being independently a hydrogen atom or $C_1$-$C_{20}$ alkyl group, —$SO_3)_wX'$ and/or —$COO)_wX'$, wherein X' is an alkaline or alkaline earth metal or an ammonium salt of formula $NR''_4$, with each of the R'' group being independently a hydrogen atom or $C_1$-$C_{20}$ alkyl group and w being 1 or 2 for satisfying neutrality.

Suitable examples of $T_1$ or $T_2$ non functional groups, free from O, S, N, P heteroatoms, are notably —H, —F, —Cl, —$CF_3$, —$C_2F_5$, —$CF_2Cl$, —$CF_2CF_2Cl$.

More preferably, the functional (per)fluoropolyethers suitable for the invention are chosen among the group consisting of:
(a) [X—($CF_2CF(CF_3)O)_nCF_2COO^-$]M, with X being a halogen, preferably Cl or F, M being a univalent cation such as $H^+$, $Na^+$, $Li^+$, $K^+$, $NH_4^+$ and n being an integer ranging between 2 and 10, preferably between 2 and 6;
(b) [X—($CF_2CF(CF_3)O)_nCF_2COO^-]_2M''$, with X being a halogen, preferably Cl or F, M'' being a divalent cation such as $Ca^{++}$, $Mg^{++}$, $Zn^{++}$, and n being an integer ranging between 2 and 10, preferably between 2 and 6;
(c) $(HO)_2OPO$—$CH_2CF_2O$—$(CF_2CF_2O)_{m'}(CF_2O)_{n'}$—$CF_2CH_2OPO(OH)_2$, m' and n' being integers, where the ratio m'/n' generally ranges between 0.1 and 10, preferably between 0.2 and 5 and the sum m'+n' ranging between 2 and 10, preferably between 2 and 6.

Good results have been obtained with (per)fluoropolyethers of formula (a) here above wherein M=$NH_4^+$, and (b) here above, wherein M''=Ca.

The functional (per)fluoropolyethers of the invention can be notably manufactured by photoinitiated oxidative polymerization (photooxidation reaction) of per(halo)fluoromonomers, as described in U.S. Pat. No. 3,665,041. Typically, (per)fluoropolyethers structures can be obtained by combination of hexafluoropropylene and/or tetrafluoroethylene with oxygen at low temperatures, in general below −40° C., under U.V. irradiation, at a wavelength (λ) of less than 3 000 Å. Subsequent conversion of end-groups as described in U.S. Pat. Nos. 3,847,978 and 3,810,874 is notably carried out on crude products from photooxidation reaction.

The functional (per)fluoropolyethers of types (a), (b) and (c), as above described, are notably available from Solvay Solexis S.p.A. as FLUOROLINK®.

It has been surprisingly found that the use of functional (per)fluoropolyethers as surfactant advantageously enables polymerizing the fluorinated monomer(s) in a $CO_2$-comprising medium without substantial fouling of the reactor walls. The avoidance of fouling represents a great advantage, as it reduces the shut-down of pressure vessels due to cleaning and maintenance and increase on-line times.

Moreover, polymer product of fluorinated monomer(s) obtained in a $CO_2$-comprising medium comprising the fluorinated monomer(s) advantageously possesses an improved morphology: the fraction of particles of regular shape is substantially increased, which enables easier handling of the same. Thus, polymer particles of spherical shape have been obtained, while the spongy-like polymer fraction was substantially reduced or even suppressed.

The radical initiators suitable for the process according to the invention are compounds capable of initiating and/or accelerating the polymerization.

The initiator is advantageously included in a concentration ranging from 0.001 to 20 percent by weight of the polymerization medium.

Those skilled in this art will be familiar with a number of initiators that are soluble in the polymerization medium. Organic free radical initiators are preferred and include, but are not limited to, the following: acetylcyclohexanesulfonyl peroxide; diacetylperoxydicarbonate; dialkylperoxydicarbonates such as diethylperoxydicarbonate, dicyclohexylperoxydicarbonate, di-2-ethylhexylperoxydicarbonate; tert-butylpemeodecanoate; 2,2'-azobis(4-methoxy-2,4dimethylvaleronitrile; tert-butylperpivalate; dioctanoylperoxide; dilauroyl-peroxide; 2,2'-azobis (2,4- dimethylvaleronitrile); tert-butylazo-2-cyanobutane; dibenzoylperoxide; tert-butyl-per-2ethylhexanoate; tert-butylpermaleate; 2,2'-azobis(isobutyronitrile); bis(tert-butylperoxy) cyclohexane; tert-butyl-peroxyisopropylcarbonate; tert-butylperacetate; 2,2'-bis(tert-butylperoxy)butane; dicumyl peroxide; di-tert-amyl peroxide; di-tert-butyl peroxide; p-methane hydroperoxide; pinane hydroperoxide; cumene hydroperoxide; and tert-butyl hydroperoxide. Other suitable initiators include halogenated free radical initiators such as chlorocarbon based and fluorocarbon based acyl peroxides such as trichloroacetyl peroxide, bis(perfluoro-2-propoxy propionyl)peroxide, $[CF_3CF_2CF_2OCF(CF_3)COO]_2$, perfluoropropionyl peroxides, $(CF_3CF_2CF_2COO)_2$, $(CF_3CF_2COO)_2$, $\{(CF_3CF_2CF_2)-[CF(CF_3)CF_2O]_m-CF(CF_3)-COO\}_2$ where m=0-8, $[ClCF_2(CF_2)_nCOO]_2$, and $[HCF_2(CF_2)_nCOO]_2$ where n=0-8; perfluoroalkyl azo compounds such as perfluoroazoisopropane, $[(CF_3)_2CFN=]_2$, $R^\square N=NR^\square$, where $R^\square$ is a linear or branched perfluorocarbon group having 1-8 carbons; stable or hindered perfluoroalkane radicals such as hexafluoropropylene trimer radical, $[(CF_3)_2CF]_2(CF_2CF_2)C^{574}$ radical and perfluoroalkanes.

Redox systems, comprising at least two components forming a redox couple, such as dimethylaniline-benzoyl peroxide, diethylaniline-benzoyl peroxide and diphenylamine-benzoyl peroxide can also be used to initiate the polymerization.

Should the fluorinated monomer comprise TFE, in the process of the present invention, as the polymerization initiator, a redox polymerization initiator comprising a combination of a halogen acid salt and a sulfite as described in U.S. Pat. No. 6,822,060 or a Ce(IV) salt/oxalic acid combination as described in U.S. Pat. No. 4,654,406 or a disuccinic acid peroxide (DSAP) and ammonium sulphite (AMS) combination as described in U.S. Pat. No. 4,766,188, can be notably used.

The halogen acid salt as above mentioned is represented by the general formula $YXO_3$ wherein X is a chlorine atom, a bromine atom or an iodine atom and Y is a hydrogen atom, ammonium, an alkali metal or an alkaline earth metal. The sulfite as above mentioned is represented by general formulae $Z'_2SO_3$ wherein Z is ammonium, an alkali metal or $Z''SO_3$ wherein Z" is an alkaline earth metal. Among such redox radical initiators for TFE, a redox polymerization initiator comprising a combination of a bromate and a sulfite is preferred, and a redox polymerization initiator comprising a combination of potassium bromate and ammonium sulfite, is most preferred.

When said redox polymerization initiators are employed, both the components may be added simultaneously or sequentially to the reaction vessel. It is preferred that either one is preliminarily charged into the reaction vessel, then the other is intermittently or continuously added during the polymerization.

Should the fluorinated monomer comprise vinylidene fluoride, the preferred initiators are dialkylperoxydicarbonates as above described; excellent results have been obtained with diethylperoxydicarbonate.

The polymerization may be also carried out in the presence of chain regulators or other polymerization additives, such as suspending agents, anti-fouling agents, and the like.

When a chain regulator is used, this is employed in the usual amounts. To be more specific, the chain regulators are generally used in an amount of about 0.5 to 5% by weight with respect to the fluorinated monomer(s) employed. The chain regulator may be employed all at the start of the polymerization or else in portions or continuously during polymerization.

The polymerization medium of the present invention comprises carbon dioxide. The carbon dioxide can be employed in a liquid, vapor, or supercritical phase.

Preferably, the carbon dioxide is in a liquid or supercritical phase. As used herein, "supercritical" means that a fluid medium is at a temperature that is sufficiently high that it cannot be liquified by pressure. The thermodynamic properties of carbon dioxide are reported in Hyatt, J. Ors. Chem. 49:50975101 (1984); therein, it is stated that the critical temperature of carbon dioxide is about 31° C.

The reaction temperature should be advantageously chosen to provide sufficient heat energy to initiate and propagate the polymerization. Generally, polymerization temperature exceeds −50° C., preferably −20° C., particularly preferably 0° C. Usually, temperature is less than 200° C., preferably less than 175° C., particularly preferably less than 150° C., most preferably less than 100° C.

The advantage of conducting the polymerization with supercritical carbon dioxide stems notably from the tendency of the solvent strength in a supercritical phase to be easily manipulated by varying the pressure of the fluid.

Generally, polymerization pressure exceeds 5 bar, preferably 35 bar, particularly preferably 40 bar. Usually, polymerization pressure is less than 3000 bar, preferably less than 1000 bar, particularly preferably less than 700 bar, most preferably less than 500 bar.

The use of supercritical carbon dioxide notably permits one carrying out the polymerization to significantly influence the particle size, distribution, and other aspects of the final product without varying either the solvent temperature or composition (i.e., including a co solvent), by simply modifying the pressure.

The polymerizing process of the present invention can be carried out using apparatus and conditions known to those skilled in this art.

In general, the polymerization process of the invention is carried out in stirred tank reaction vessels provided with a blade or shaft stirrer or impeller or in loop reactors equipped with a circulating means (centrifugal pump, axial pump, impeller and the like).

The polymerization process may be carried out batchwise or continuously with thorough mixing of the reactants (i.e., monomer or monomers, functional (per)fluoropolyether and initiator) in any appropriate high pressure vessel.

In particular, it has been found that employing a continuous or semi-batch reactor may be useful to control polymer composition and composition distribution and may be useful in the copolymerization of two monomers with different reactivities.

Typically, the polymerization can be carried out by charging the reaction vessel with the fluorinated monomer(s), the functional (per)fluoropolyether, the initiator, and carbon dioxide, closing the reaction vessel, and bringing the reaction mixture to an appropriate temperature and pressure.

The manner in which the fluorinated monomer(s), the initiator and the functional (per)fluoropolyether are employed is not critical.

The fluorinated monomer(s) may be employed all at the start of the polymerization or else a portion of the fluorinated monomer(s) may be added at the start of the polymerization and the rest during polymerization. Similarly, the functional (per)fluoropolyether may be employed all at the start of the polymerization or else a portion of the functional (per)fluoropolyether may be added at the start of the polymerization and the rest during polymerization.

Preferably, in the process according to the invention, at least a part of the fluorinated monomer(s) and of the functional (per)fluoropolyether are introduced at the start of the polymerization.

The weight ratio between the functional (per)fluoropolyether and the fluorinated monomer(s) introduced at the start and during the polymerization advantageously ranges from 0.25 to 25%, preferably from 0.5 to 20%, particularly preferably from 1 to 15%.

Excellent results have been obtained with a weight ratio between the functional (per)fluoropolyether and the fluorinated monomer(s) introduced at the start and during the polymerization from 2.5 to 10%.

Typically the mixture is allowed to polymerize for between about 2 and 24 hours, and preferably is stirred as the reaction proceeds. At the conclusion of the polymerization, the polymer can be collected by methods such as venting of the polymerization medium or by fractionation. After separation, the polymer can be collected by conventional means.

According to an embodiment of the invention, the process of the invention further comprises a purification step for purifying the polymer product. This purification step advantageously enables recovering the functional (per)fluoropolyether from the polymer product.

Advantageously the purification step can be carried out by supercritical fluid extraction using carbon dioxide as extracting medium.

The extraction can be notably carried out in batch, continuous or semi-continuous conditions.

Preferably the extraction is carried out in semi-continuous conditions, by contacting the polymer product retained in a suitable extraction device with a continuous flow of carbon dioxide.

The extraction is carried out at a pressure of advantageously at least 20 bar, preferably at least 30 bar, more preferably at least 50 bar. The extraction is carried out at a pressure of advantageously at most 350 bar, preferably at most 300 bar, more preferably at most 250 bar.

The extraction is carried out at a temperature of advantageously at least −20° C., preferably at least −15° C., more preferably at least 0° C. The extraction is carried out at a temperature of advantageously at most 100° C., preferably at most 85° C., more preferably at most 75° C.

The extraction time is advantageously of at least 5 minutes, preferably of at least 10 minutes, and advantageously of at most 300 minutes, preferably of at most 240 minutes, even more preferably of at most 120 minutes.

Still an object of the invention is the polymer obtained from the process as above described.

The polymer obtained from the present invention can be used to form molded articles, such as pipes, flexible cable sheathing, valves and joins, bottles, films and coatings, fibers, and matrices for composite materials.

Still objects of the invention are the molded articles, such as pipes, flexible cable sheathing, valves and joins, bottles, films and coatings, fibers, and matrices for composite materials comprising the polymer obtained from the process as above described.

Some examples of the present invention are reported hereinafter, whose purpose is merely illustrative but not limitative of the scope of the invention itself.

EXAMPLES

Materials

Vinylidene fluoride monomer (VDF) is commercially available from Solvay Solexis S.p.A.

Carbon dioxide was supplied by Air Liquid and has a purity of at least 99.998%.

The diethylperoxydicarbonate (DEPDC) initiator was synthesized according to the procedure described in F. Strain et al., *J. Am. Chem. Soc.*, 1950, 72, 1254, using water as the solvent and extracting the peroxydicarbonate into FREON® 113. The concentration of active peroxide in the solution was determined by iodine titration technique, according to ASTM method E 298-91. All manipulations of the initiator solutions were performed at 0° C. and the final stock solution was stored in the dark at −22° C.

Functional (per)fluoropolyethers were available from Solvay Solexis: their structures and basic chemical properties are summarized in table 1 here below.

TABLE 1

| Functional (per) fluoropolyether | Code | Average $M_w$ [a] | n |
|---|---|---|---|
| $[Cl-(CF_2CF(CF_3)O)_n CF_2COO^-]NH_4^+$ | FLK 7004A | 1 000 | 2-6 |
|  | FLK 7850A | 500 | 2-4 |
| $[Cl-(CF_2CF(CF_3)O)_n CF_2COO^-]_2Ca$ | FLK Ca | 2 000 | 2-6 |
| $(HO)_2OPO-CH_2CF_2O-(CF_2CF_2O)_{m'}(CF_2O)_{n'}CF_2CH_2-OPO(OH)_2$ | FLK F10 | 1 000 | $m' + n' \sim 2-6$ $0.1 \leq m'/n' \leq 10$ |

[a] $M_w$ has been measured by GPC according to standard techniques.

Polymerization

Polymerization were carried out in an AISI 316 fixed volume (27 mL in the completely assembled set-up) batch reaction vessel, stirred by a magnetic bar and inserted in an automatic temperature control system.

The proper amounts of surfactant and initiator, the latter under the form of liquid solution in Freon 113, were charged in the reaction vessel; said vessel was then purged by a controlled flow rate of $CO_2$ maintained for at least 20 minutes for removing air and volatile Freon 113. After sealing the reactor, liquid VDF and $CO_2$ were added at room temperature by using two different ISCO syringe pumps. The total amount of solvent and monomer introduced were measured weighting the vessel with an electronic scale balance (Sartorius, max 8 kg, precision: 0.01 g) up to reach the target value of nominal density of the polymerization mixture (simply computed as the ratio of the total mass of $CO_2$ and VDF to the free volume of the reactor). The vessel was then inserted in the temperature control system and heated to the reaction temperature (50° C.). The time interval to reach the set-up temperature was roughly 30 minutes in each run; no particular attention was dedicated to pre-polymerization processing of the reaction medium.

At the end of the polymerization the reactor was cooled down to room temperature; unreacted VDF and $CO_2$ were slowly vented by bubbling the gas in a tetrahydrofurane-filled valve to trap solid polymer entrained by the fluid stream.

The collected polymer was washed twice at room temperature with ethanol and stored in a dry atmosphere without further treatments.

Polymer Characterization

Polymer yields were determined gravimetrically.

Particle morphologies were analyzed and imaged with a Philips scanning electron microscope (SEM). Samples were sputter-coated with gold to a thickness of 200 Å.

Percentage of organized structure (worm-like and spherical particles) in the polymer sample was determined by measuring surface area of such organized structures with respect to the total area of the sample in at least 5 specimens analyzed by SEM microscopy and image recognition.

When possible, the particle size distribution were evaluated by measuring the diameter ($D_i$) of at least 100 individual particles through a software for image analysis of micrographs, then the number-average particle size ($D_n$) and particle size distribution ($D_w/D_n$) were determined according to the method described in A. Galia et al., *J. Polym. Sci., Part A: Polym. Chem.*, 2004, 42, 173.

Results from polymerization run are summarized in Table 2 here below:

ether) were submitted to supercritical fluid extraction, using an extraction system consisting of an extractor, a controller, a pump, a pressure decreaser, a trap and a flowmeter. Samples (approximately 1 g) were placed in a stainless steel cartridge (internal volume=2.5 ml) in the ectractor and supercritical carbon dioxide was passed through said extractor at a flow rate of approximately 50 Ncm$^3$/min, at a temperature ranging from 20 to 50° C., and pressure from 90 to 250 bar, for an extraction time of at least 50 minutes.

The efficiency of the extraction process can be advantageously gravimetrically calculated according to the following equation:

$$\text{Efficiency}(\%) = \frac{\text{Recovered surfactant}}{\text{Total surfactant content}} \cdot 100$$

Results are summarized in the following tables.

TABLE 2

| Run | Surfactant type | (% w/w)$^{(\infty)}$ | VDF (M)$^{(*)}$ | P° (MPa) | ΔP (MPa) | Yield (%) | Polymer morphology (%)$^{(\S)}$ | $D_n$ (μm) |
|---|---|---|---|---|---|---|---|---|
| 1C | none | — | | 33.7 | 10.4 | 40 | 0 | n.d.$^{(\infty)}$ |
| 1 | FLK Ca | 5 | 3.4 | 24.6 | 3.4 | 30 | 20 | n.d.$^{(\infty)}$ |
| 2 | FLK 7004A | 5 | 5.6 | 33.6 | 10.0 | 41 | 60 | 0.7 |
| 3 | FLK 7004A | 10 | 5.6 | 33.3 | 12.4 | 53 | 90 | 1.6 |
| 4 | FLK 7850A | 2.5 | 5.7 | 37.3 | 12.3 | 43 | 50 | 0.9 |
| 5 | FLK 7850A | 5.0 | 5.5 | 34.5 | 13.9 | 60 | 80 | 0.8 |
| 6 | FLK 7850A | 10.0 | 5.5 | 32.6 | 11.1 | 56 | 90 | 0.8 |

DEPDC concentration: 5.5 mM; T = 50° C.; reaction time = 180 min;
$^{(\infty)}$based on the weight of VDF monomer;
$^{(*)}$initial concentration;
$^{(\S)}$percentage of organized structure (worm-like and spherical particles) in the polymer sample;
$^{(\infty)}$percentage of organized structure was too low for having a meaningful evaluation of $D_n$.

No fouling on the reactor walls has been observed in run 1 to 6.

SURFACTANT EXTRACTION

Figure 1:
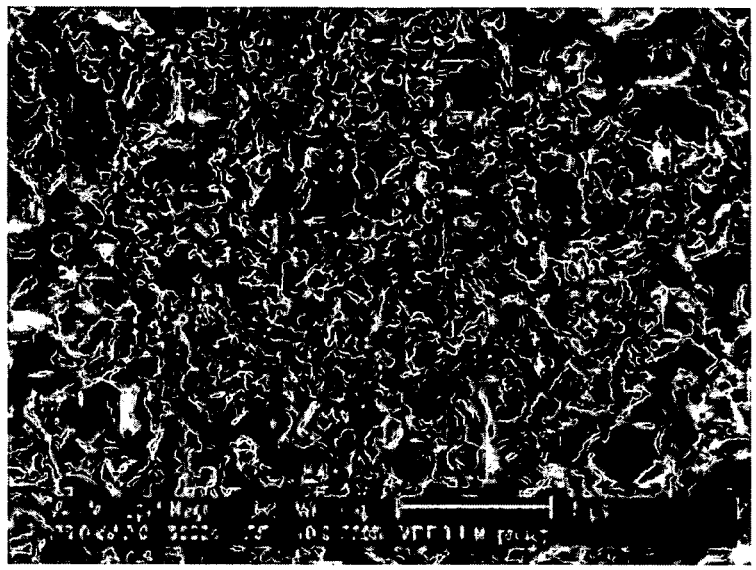
FIG. 1 depicts a SEM micrograph of PVDF synthesized in supercritical carbon dioxide in the absence of the functional (per)fluoroether surfactant.
Figure 2:
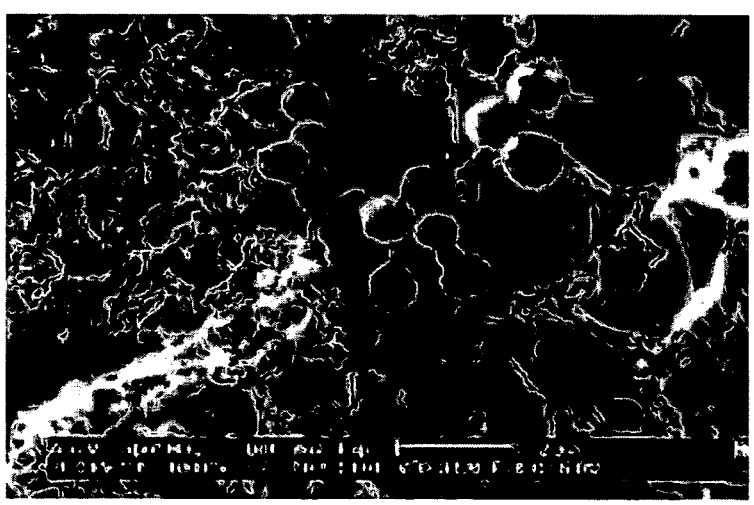
FIG. 2 depicts a SEM micrograph of PVDF synthesized in supercritical carbon dioxide according to run 1, in the presence of FLK Ca as the functional (per)fluoroether surfactant.
Figure 3:
FIG. 3 depicts a SEM micrographs of PVDF synthesized in supercritical carbon dioxide according to run 2, in the presence of FLK 7004A as the functional (per)fluoroether surfactant.
Figure 4:
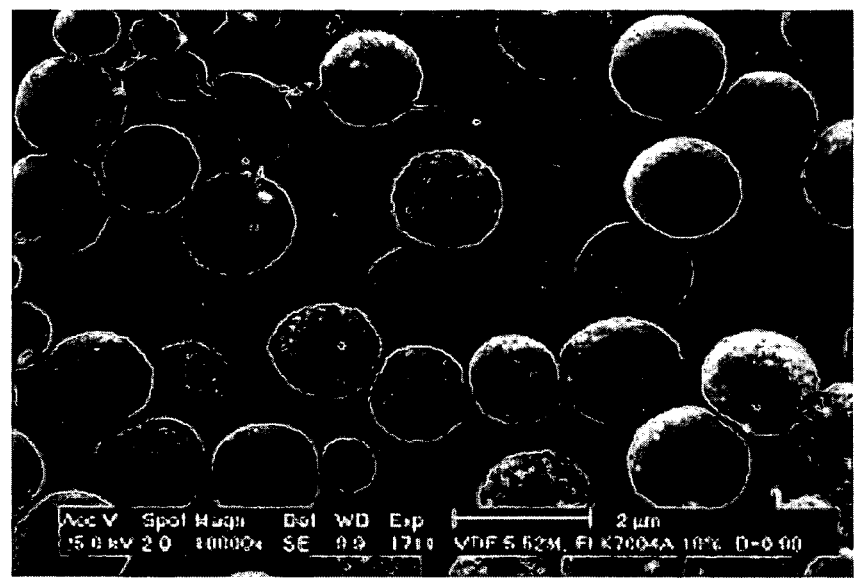
FIG. 4 depicts a SEM micrographs of PVDF synthesized in supercritical carbon dioxide according to run 3, in the presence of FLK 7004A as the functional (per)fluoroether surfactant.
Figure 5:
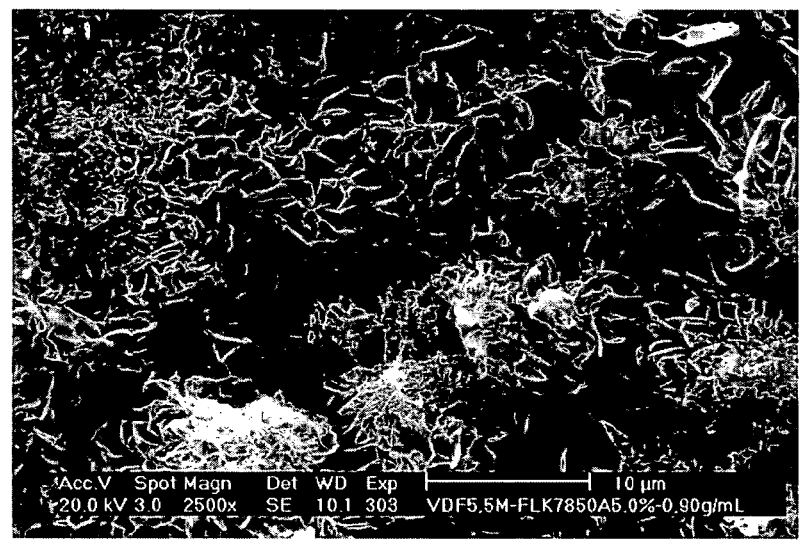
FIG. 5 depicts SEM micrographs of 2 different specimens of PVDF synthesized in supercritical carbon dioxide according to run 5, in the presence of FLK 7850 as the functional (per)fluoroether surfactant.
Figure 5:
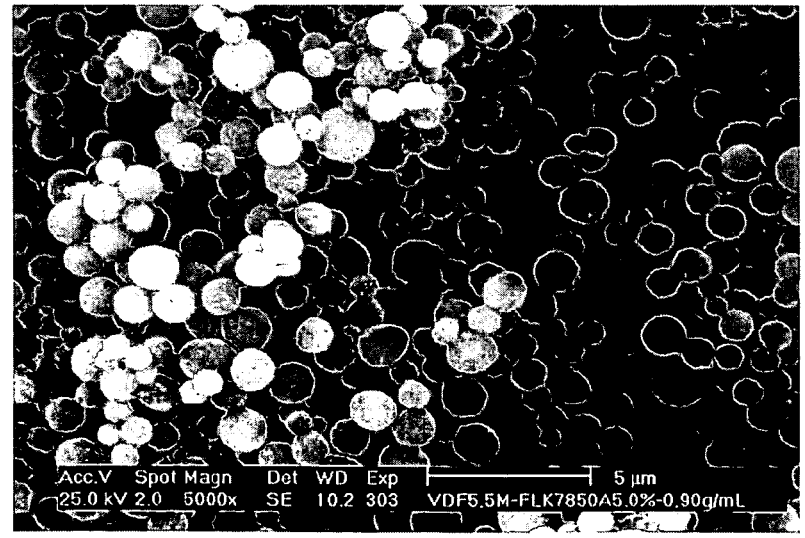

Samples of polymer obtained in runs 2 and 5 as above described (comprising 5% wt of functional (per)fluoropoly-

TABLE 3

Extraction from sample containing functional (per)fluoropolyether FLK 7004 A (supercritical carbon dioxide, flow rate = 50 Ncm$^3$/min, extraction time = 95 minutes)

| T (° C.) | P (bar) | Efficiency (%) | T (° C.) | P (bar) | Efficiency (%) |
|---|---|---|---|---|---|
| 40 | 95 | 0-6 | 40 | 200 | 94-100 |
| 40 | 100 | 23-26 | 20 | 120 | 69-75 |
| 40 | 120 | 89-95 | 35 | 120 | 95-100 |
| 40 | 160 | 91-97 | 50 | 120 | 8-10 |

TABLE 4

Extraction from sample containing functional (per)fluoropolyether FLK 7850 A (supercritical carbon dioxide, flow rate = 50 Ncm$^3$/min, extraction time = 120 minutes)

| T (° C.) | P (bar) | Efficiency (%) |
|---|---|---|
| 40 | 90 | 4-8 |
| 40 | 100 | 25-29 |
| 40 | 120 | 86-92 |
| 40 | 200 | 93-99 |
| 40 | 250 | 88-94 |

The above written description of the invention provides a manner and process of making and using it such that any person skilled in this art is enabled to make and use the same, this enablement being provided in particular for the subject matter of the appended claims, which make up a part of the original description, and including the following preferred embodiments:

1—Polymerization process comprising polymerizing at least one fluorinated monomer in the presence of a radical initiator and a surfactant in a polymerization medium comprising carbon dioxide to provide a polymer product, characterized in that the surfactant is a functional (per)fluoropolyether, said functional (per)fluoropolyether being a polymer comprising recurring units (R1) and at least one functional group comprising a heteroatom other than fluorine, said recurring units comprising at least one ether linkage in the main chain and at least one fluorine atom (fluoropolyoxyalkene chain).

2—Polymerization process according to embodiment 1, characterized in that it provides a heterogeneous reaction mixture comprising the polymer product in the polymerization medium.

3—Polymerization process according to either embodiment 1 or 2, characterized in that the fluorinated monomer is chosen among:
- $C_2$-$C_8$ perfluoroolefins, such as tetrafluoroethylene (TFE) and hexafluoropropene (HFP);
- $C_2$-$C_8$ hydrogenated fluoroolefins, such as vinyl fluoride, vinylidene fluoride, 1,2-difluoroethylene and trifluoroethylene;
- $C_2$-$C_8$ perhalofluoromonomers, such as chlorotrifluoroethylene;
- perfluoroalkylethylenes complying with formula $CH_2=CH-R_{f0}$, in which $R_{f0}$ is a $C_1$-$C_6$ perfluoroalkyl;
- chloro- and/or bromo- and/or iodo-$C_2$-$C_6$ fluoroolefins, like chlorotrifluoroethylene;
- (per)fluoroalkylvinylethers complying with formula $CF_2=CFOR_{f1}$ in which $R_{f1}$ is a $C_1$-$C_6$ fluoro- or perfluoroalkyl, e.g. $CF_3$, $C_2F_5$, $C_3F_7$;
- $CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;
- (per)fluoroalkylvinylethers complying with formula $CF_2=CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like —$C_2F_5$—O—$CF_3$;
- functional (per)fluoro-oxyalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;
- fluorodioxoles, especially perfluorodioxoles;
- and mixtures thereof.

4—Polymerization process according to embodiment 3, characterized in that the fluorinated monomer is chosen from the group consisting of tetrafluoroethylene (TFE), vinylidene fluoride (VDF), chlorotrifluoroethylene (CTFE) and mixtures thereof.

5—Polymerization process according to anyone of preceding embodiments, characterized in that the weight average molecular weight of the functional (per)fluoropolyether is comprised between 400 and 100 000.

6—Polymerization process according to anyone of preceding embodiments, characterized in that the recurring units R1 of the functional (per)fluoropolyether are selected from the group consisting of:
(I) —CFX—O—, wherein X is —F or —$CF_3$; and
(II) —$CF_2$—CFX—O—, wherein X is —F or —$CF_3$; and
(III) —$CF_2$—$CF_2$—$CF_2$—O—; and
(IV) —$CF_2$—$CF_2$—$CF_2$—$CF_2$—O—; and
(V) —$CF_2)_j$—CFZ-O— wherein j is an integer from 0 to 3 and Z is a fluoropolyoxyalkene chain comprising from 1 to 20 recurring units chosen among the classes (I) to (IV) here above;

and mixtures thereof.

7—Polymerization process according to Embodiment 6, characterized in that the functional (per)fluoropolyethers is chosen among the group consisting of:
(a) $[X—(CF_2CF(CF_3)O)_nCF_2COO^-]M$, with X being a halogen, M being a univalent cation such as $H^+$, $Na^+$, $Li^+$, $K^+$, $NH_4^+$ and n being an integer ranging between 2 and 10;
(b) $[X—(CF_2CF(CF_3)O)_nCF_2COO^-]_2M''$, with X being a halogen, M'' being a divalent cation such as $Ca^{++}$, $Mg^{++}$, $Zn^{++}$, and n being an integer ranging between 2 and 10;
(c) $(HO)_2OPO—CH_2CF_2O—(CF_2CF_2O)_{m'}(CF_2O)_{n'}—CF_2CH_2OPO(OH)_2$, m' and n' being integers, where the ratio m'/n' generally ranges between 0.1 and 10, the sum m'+n' ranging between 2 and 10.

8—Polymerization process according to anyone of preceding embodiments, characterized in that the fluorinated monomer comprise vinylidene fluoride and the radical initiator is a dialkylperoxydicarbonate such as diethylperoxydicarbonate, dicyclohexylperoxydicarbonate and di-2-ethylhexyl peroxydicarbonate.

9—Polymerization process according to anyone of preceding embodiments, characterized in that it further comprises a purification step for purifying the polymer product.

10—Polymerization process according to embodiment 9, characterized in that the purification step is carried out by supercritical fluid extraction using carbon dioxide as extracting medium.

11—Molded articles, such as pipes, flexible cable sheathing, valves and joins, bottles, films and coatings, fibers, and matrices for composite materials comprising the polymer obtained from the process according to anyone of embodiments 1 to 10.

The invention claimed is:

1. A polymerization process comprising polymerizing at least one fluorinated monomer in the presence of a radical initiator and a surfactant in a polymerization medium consisting essentially of carbon dioxide to provide a polymer product, wherein the surfactant is $(HO)_2OPO—CH_2CF_2O—(CF_2CF_2O)_{m'}(CF_2O)_{n'}—CF_2CH_2OPO(OH)_2$, m' and n' being integers, where the ratio m'/n' is from 0.1 to 10, the sum m'n' being from 2 to 10.

2. The polymerization process according to claim 1, wherein the fluorinated monomer comprises vinylidene fluoride and the radical initiator is a dialkylperoxydicarbonate.

3. The polymerization process according to claim 1, wherein the fluorinated monomer comprises vinylidene fluoride and the radical initiator is at least one of diethylperoxydicarbonate, dicyclohexylperoxydicarbonate and di-2-ethylhexyl peroxydicarbonate.

4. The polymerization process according to claim 1, said process further comprising purifying the polymer product.

5. The polymerization process according to claim 4, wherein the polymer product is purified by supercritical fluid extraction using carbon dioxide as extracting medium.

6. A molded article comprising the polymer obtained from the process according to claim 1.

7. The molded article according to claim 6, wherein said article is a pipe, a flexible cable sheathing, a valve, a joins, a bottle, a film, a coating, a fiber, or a matrix for composite material.

8. The polymerization process according to claim 1, wherein the carbon dioxide is present in a liquid phase.

9. The polymerization process according to claim 1, wherein the carbon dioxide is present in a supercritical phase.

10. The polymerization process according to claim 1, wherein the carbon dioxide is present in a supercritical phase, and the at least one fluorinated monomer is at least one selected from the group consisting of tetrafluoroethylene (TFE), vinylidene fluoride (VDF), chlorotrifluoroethylene (CTFE) and mixtures thereof.

11. The polymerization process according to claim 1, wherein it provides a heterogeneous reaction mixture comprising the polymer product in the polymerization medium.

12. The polymerization process according to claim 1, wherein the at least one fluorinated monomer is at least one chosen from $C_2$-$C_8$ perfluoroolefins;

$C_2$-$C_8$ hydrogenated fluoroolefins;

$C_2$-$C_8$ perhalofluoromonomers;

perfluoroalkylethylenes complying with formula $CH_2=CH-R_{f0}$, in which $R_{f0}$ is a $C_1$-$C_6$ perfluoroalkyl;

chloro- and/or bromo- and/or iodo-$C_2$-$C_6$ fluoroolefins;

(per)fluoroalkylvinylethers complying with formula $CF_2=CFOR_{f1}$ in which $R_{f1}$ is a $C_1$-$C_6$ fluoro- or perfluoroalkyl;

$CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups;

(per)fluoroalkylvinyl ethers complying with formula $CF_2=CFOCF_2OR_{f2}$ in which $R_{f2}$ is a $C_1$-$C_6$ fluoro- or perfluoroalkyl, or a $C_1$-$C_6$ (per)fluorooxyalkyl having one or more ether groups;

functional (per)fluoro-oxyalkylvinylethers complying with formula $CF2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;

fluorodioxoles;

and mixtures thereof.

13. The polymerization process according to claim 12, wherein the at least one fluorinated monomer is at least one chosen from the group consisting of tetrafluoroethylene (TFE), vinylidene fluoride (VDF), chlorotrifluoroethylene (CTFE) and mixtures thereof.

* * * * *